United States Patent
Tsao et al.

(10) Patent No.: US 10,082,707 B2
(45) Date of Patent: Sep. 25, 2018

(54) PIXEL STRUCTURE AND DISPLAY PANEL

(71) Applicant: Au Optronics Corporation, Hsinchu (TW)

(72) Inventors: Tzu-Yi Tsao, Taipei (TW);
Fang-Cheng Yu, Taipei (TW);
Wei-Ting Lee, Taipei (TW);
Cheng-Yeh Tsai, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 254 days.

(21) Appl. No.: 15/058,155

(22) Filed: Mar. 2, 2016

(65) Prior Publication Data
US 2017/0131597 A1    May 11, 2017

(30) Foreign Application Priority Data

Nov. 11, 2015  (TW) .............................. 104137157 A

(51) Int. Cl.
| | | |
|---|---|---|
| *G02F 1/1343* | (2006.01) | |
| *G02F 1/1362* | (2006.01) | |
| *G02F 1/1368* | (2006.01) | |
| *G02F 1/137* | (2006.01) | |

(52) U.S. Cl.
CPC ...... *G02F 1/134309* (2013.01); *G02F 1/1368* (2013.01); *G02F 1/134363* (2013.01); *G02F 1/136286* (2013.01); *G02F 2001/13793* (2013.01)

(58) Field of Classification Search
None
See application file for complete search history.

(56) References Cited

U.S. PATENT DOCUMENTS

| | | |
|---|---|---|
| 6,506,617 B1 | 1/2003 | Cheng |
| 6,642,071 B2 | 11/2003 | Cheng |
| 8,319,924 B2 | 11/2012 | Kim et al. |
| 8,514,361 B2 | 8/2013 | Hirakata et al. |
| 8,786,811 B2 | 7/2014 | Kubota et al. |
| 9,122,110 B2 | 9/2015 | Kubota et al. |
| 2003/0085406 A1 | 5/2003 | Cheng |
| 2010/0091228 A1 | 4/2010 | Kim et al. |
| 2013/0135563 A1 | 5/2013 | Kubota et al. |
| 2013/0229609 A1 | 9/2013 | Jeong et al. |
| 2015/0346568 A1 | 12/2015 | Kubota et al. |

FOREIGN PATENT DOCUMENTS

| | | |
|---|---|---|
| JP | 2011039314 | 2/2011 |
| TW | 522570 | 3/2003 |
| TW | I303886 | 12/2008 |
| TW | 201329590 | 7/2013 |

*Primary Examiner* — Richard Kim
(74) *Attorney, Agent, or Firm* — JCIPRNET

(57) ABSTRACT

A pixel structure including a scan line, a data line, an active device, a first protruding structure, a second protruding structure, a first electrode and a second electrode is provided. The first protruding structure has a first top surface, a first bottom surface and first side surfaces located on both sides of the first top surface and the first bottom surface. A first acute angle θ1 is formed between the first top surface and the first side surfaces. The second protruding structure has a second top surface, a second bottom surface and second side surfaces located on both sides of the second top surface and the second bottom surface. A second acute angle θ2 is formed between the second top surface and the second side surfaces. The first electrode is disposed on the first top surface, and the second electrode is disposed on the second top surface.

17 Claims, 11 Drawing Sheets

PIXEL STRUCTURE AND DISPLAY PANEL

CROSS-REFERENCE TO RELATED APPLICATION

This application claims the priority benefit of Taiwan application serial no. 104137157, filed on Nov. 11, 2015. The entirety of the above-mentioned patent application is hereby incorporated by reference herein and made a part of this specification.

BACKGROUND OF THE INVENTION

Field of the Invention

The invention is related to a pixel structure, and particularly to a pixel structure suitable for blue phase liquid crystals and a display panel thereof.

Description of Related Art

To satisfy public demand, manufacturers in the field of display devices are devoted to the development of blue phase liquid crystal display devices which have the property of quick response time. Take blue phase liquid crystal material as an example, generally a transverse electric field is required such that the blue phase liquid crystal material can function as a light valve. Presently, an electrode design of IPS (In-Plane Switching) display module has been used by manufacturers to drive the blue phase liquid crystal molecules in the blue phase liquid crystal display device.

Generally speaking, when a display device has a favorable performance in dark state or bright state, a display contrast ratio may be enhanced to provide a more preferable display quality for the display device. However, in most cases, the problem of high operation voltage occurs on the blue phase liquid crystal display device. In reducing operation voltage, the known methods also cause problems such as light leakage in a dark state and decreased contrast ratio and the like. Therefore, how to reduce operation voltage of a display device and reduce light leakage in a dark state to enhance contrast ratio has become an important research topic for persons skilled in the art.

SUMMARY OF THE INVENTION

The invention provides a pixel structure used for reducing operation voltage of a display panel and for reducing light leakage in a dark state to enhance contrast ratio.

In the invention, a pixel structure includes a scan line, a data line, an active device, at least one first protruding structure, at least one second protruding structure, a first electrode and a second electrode. The active device is electrically connected to the scan line and the data line. The first protruding structure has a first top surface, a first bottom surface, and first side surfaces located on both sides of the first top surface and the first bottom surface. A first acute angle θ1 is formed between the first top surface and any one of the first side surfaces. The second protruding structure and the first protruding structure are separated from each other. The second protruding structure has a second top surface, a second bottom surface, and second side surfaces located on both sides of the second top surface and the second bottom surface. A second acute angle θ2 is formed between the second top surface and any one of the second side surfaces. The first electrode is disposed on the first top surface of the first protruding structure, and the second electrode is disposed on the second top surface of the second protruding structure.

The invention also provides another pixel structure including a scan line, a data line, an active device, at least one first protruding structure, at least one second protruding structure, a first electrode and a second electrode. The active device is electrically connected to the scan line and the data line. The first protruding structure has a first top surface and a first bottom surface. The first top surface has a width TW1, and the first bottom surface has a width BW1; wherein TW1 is the maximum width of the first protruding structure and BW1 is the minimum width of the first protruding structure. Or, there is a minimum width of the first protruding structure between the first top surface and the first bottom surface of the first protruding structure, and TW1 or BW1 is the maximum width of the first protruding structure. The second protruding structure and the first protruding structure are separated from each other. The second protruding structure has a second top surface and a second bottom surface. The second top surface has a width TW2, and the second bottom surface has a width BW2; wherein TW2 is the maximum width of the second protruding structure and BW2 is the minimum width of the second protruding structure. Or, there is a minimum width of the second protruding structure between the second top surface and the second bottom surface of the second protruding structure, and TW2 or BW2 is the maximum width of the second protruding structure. The first electrode has a first potential, and is located on the first top surface of the first protruding structure, and the maximum width thereof is W. Meanwhile, W≥TW1 and W≥BW1. The second electrode has a second potential, and is located on the second top surface of the second protruding structure, and the maximum width thereof is W'. Meanwhile, W'≥TW2 and W'≥BW2.

In the invention, a display panel includes a first substrate, a pixel array, a second substrate and a display medium. The pixel array is disposed on the first substrate and includes a plurality of pixel structures. Each pixel structure includes a scan line, a data line, an active device, at least one protruding structure, at least one second protruding structure, a first electrode and a second electrode. The active device is electrically connected to the scan line and the data line. The first protruding structure has a first top surface, a first bottom surface and first side surfaces located on both sides of the first top surface and the first bottom surface. A first acute angle θ1 is formed between the first top surface and any one of the first side surfaces. The second protruding structure and the first protruding structure are separated from each other. The second protruding structure has a second top surface, a second bottom surface, and second side surfaces located on both sides of the second top surface and the second bottom surface. A second acute angle θ2 is formed between the second top surface and any one of the second side surfaces. The first electrode is disposed on the first top surface of the first protruding structure. The second electrode is disposed on the second top surface of the second protruding structure. The second substrate is disposed on an opposite side to the first substrate. A display medium is disposed between the first substrate and the second substrate, and has optical isotropy and optical anisotropy based on driving of voltage.

Based on the above, in the invention, the pixel structure and display panel have the first protruding structure and the second protruding structure. The first electrode and the second electrode are respectively disposed on the first top surface and the second top surface of the first protruding structure and the second protruding structure. With such configuration, in the pixel structure of the invention, the disposition of the protruding structure can reduce the operation voltage of display panel and solve the light leakage problem in the dark state so as to enhance contrast ratio.

In order to make the aforementioned features and advantages of the invention more comprehensible, embodiments accompanying figures are described in detail below.

DESCRIPTION OF EMBODIMENTS

Figure 1:
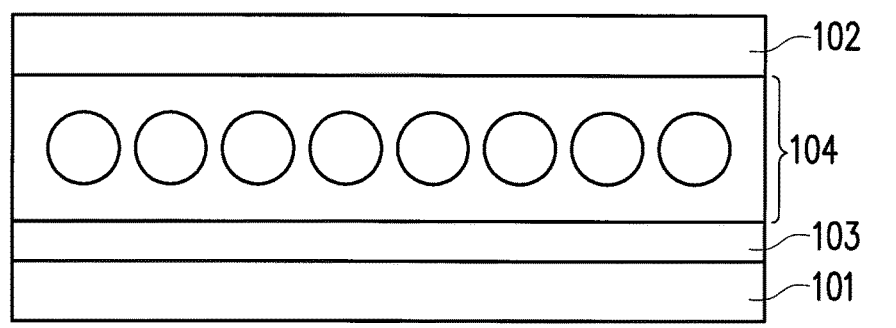
FIG. 1 is a schematic view illustrating a display panel according to a first embodiment of the invention.

FIG. 1 is a schematic view illustrating a display panel according to a first embodiment of the invention. Referring to FIG. 1, a display panel 100 includes a first substrate 101, a second substrate 102, a pixel array 103 and a display medium 104. The second substrate 102 is disposed on an opposite side to the first substrate 101. The pixel array 103 is disposed on the first substrate 101 and includes a plurality of pixel structures. The display medium 104 is disposed between the first substrate 101 and the second substrate 102. The display medium 104 has optical isotropy and optical anisotropy based on driving of voltage. For example, the display medium 104 may be blue-phase liquid crystal. In order to broaden the blue-phase temperature range of the blue-phase liquid crystal, the blue-phase liquid crystal can be stabilized by polymers. The blue-phase liquid crystal is known to persons of ordinary skill in the art; therefore, its description thereof is not repeated herein. The following paragraph is dedicated to descriptions of an embodiment about the pixel array 103 of the invention.

Figure 2:
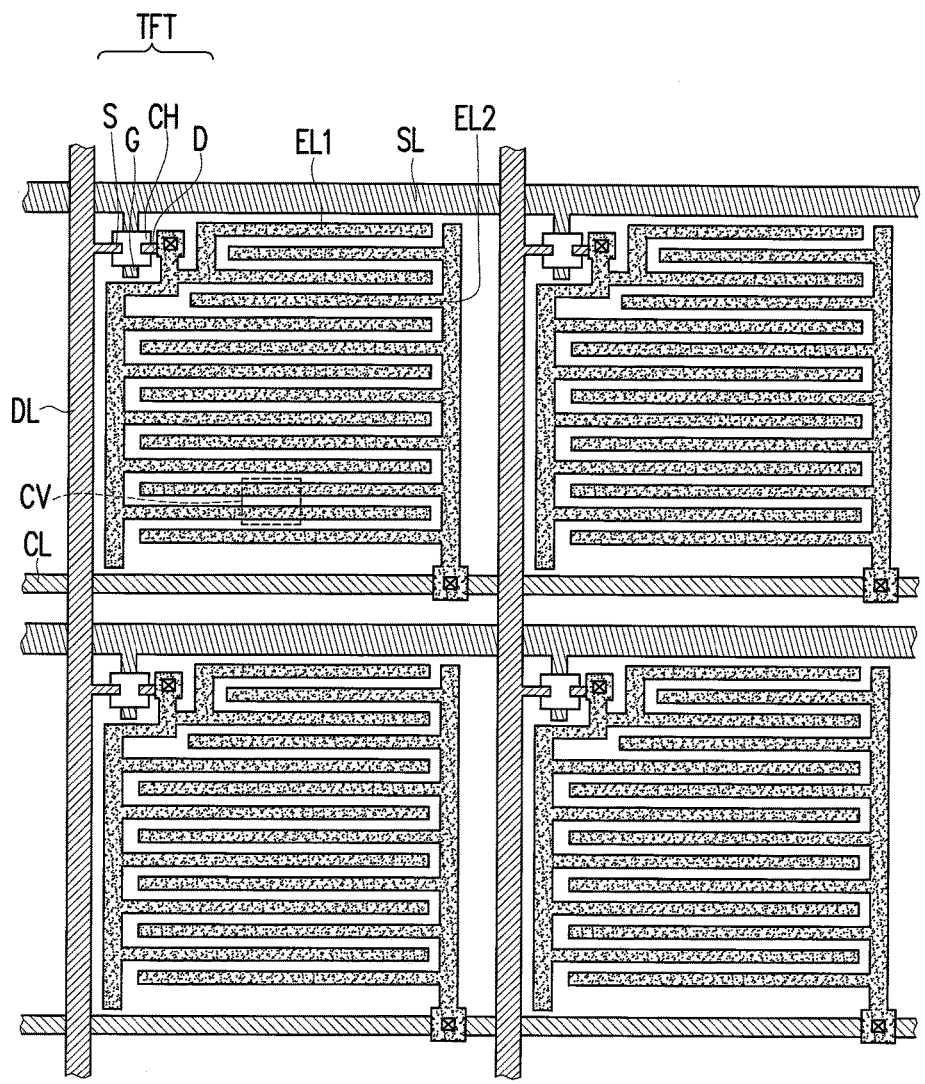
FIG. 2 is a top view illustrating a pixel array according to the first embodiment of the invention.
Figure 3A:
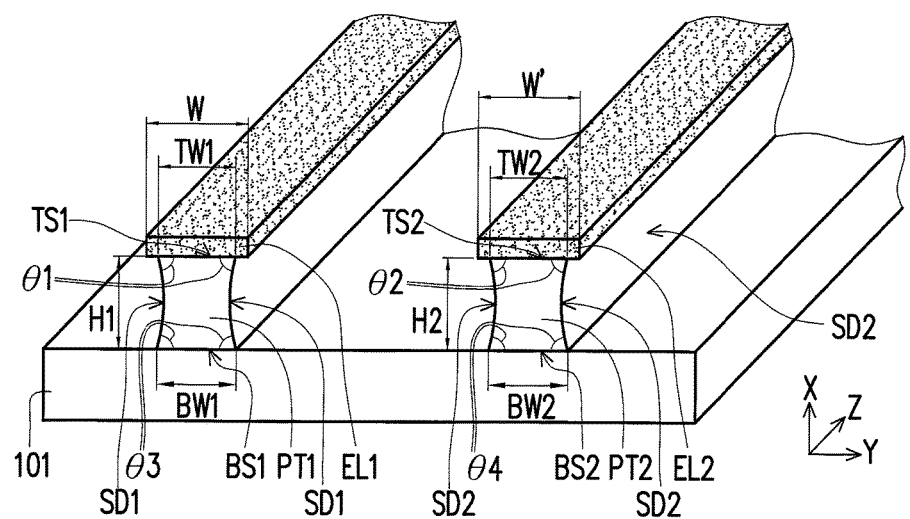
FIG. 3A is a perspective view illustrating a region CV of a pixel structure in FIG. 2.
Figure 3B:
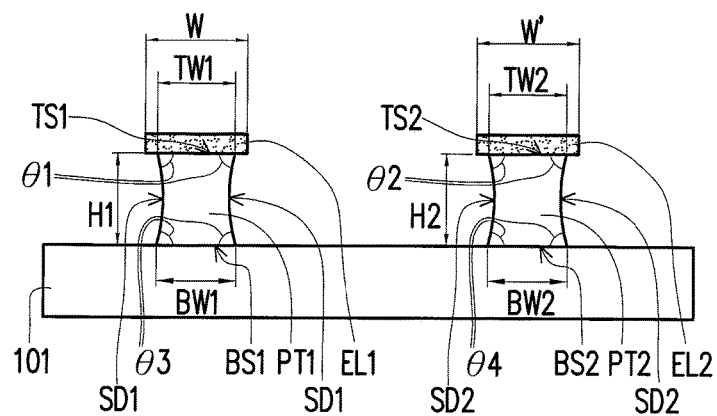
FIG. 3B is a front view illustrating a pixel structure shown by FIG. 3A.

FIG. 2 is a schematic view illustrating a pixel array according to a first embodiment of the invention. FIG. 3A is a perspective view illustrating a region CV of a pixel structure in FIG. 2. FIG. 3B is a front view illustrating the pixel structure shown by FIG. 3A. Referring to FIG. 2, FIG. 3A and FIG. 3B, specifically, the pixel array of the invention includes a plurality of pixel structures. Each pixel structure includes a scan line SL, a data line DL, an active device TFT, at least one first protruding structure PT1, at least one second protruding structure PT2, a first electrode EL1 and a second electrode EL2. The scan line SL and data line DL are configured to intersect each other. Preferably, the scan line SL and data line DL are configured to be perpendicular to each other. In consideration of conductivity, the scan line SL and data line DL are made of metal materials; however, the invention is not limited thereto. According to other embodiments, the scan line SL and data line DL may also be formed of other conductive materials such as alloy, metal nitride, metal oxide, metal oxynitride, other suitable materials, or a layer in which the metal material and other conductive material are stacked to each other.

The active device TFT may be a bottom gate TFT or a top gate TFT, which includes a gate G, a channel CH, a source S and a drain D. The active device TFT is electrically connected to a corresponding scan line SL and a corresponding data line DL. Here, the active device TFT may serve as a switch device for controlling whether a voltage information is applied to the first electrode EL1 When the active device TFT is turned on to write the voltage information into the first electrode EL1, the first electrode EL1 has a first potential which has a different value from a second potential of the second electrode EL2 electrically connected to a common electrode line CL. The potential difference between the first electrode EL1 and the second electrode EL2 causes a lateral electric field E1 to be generated between the two electrodes so as to drive the display medium.

Referring to FIG. 3A and FIG. 3B, a first protruding structure PT1 has a first top surface TS1, a bottom surface BS1 and first side surfaces SD1 located on both sides of the first top surface TS1 and the bottom surface BS1. The first protruding structure PT1 extends in a Z direction, and the first side surface SD1 is a side surface that extends in the Z direction. The first top surface TS1 has a width TW1. A first acute angle θ1 is formed between the first top surface TS1 and any one of first side surfaces SD1, wherein the first acute angle satisfies 15°≤θ1<90°. The first bottom surface BS1 has a width BW1. A third acute angle θ3 is formed between the first bottom surface BS1 and any one of first side surfaces SD1, wherein the third acute angle satisfies 15°≤θ3<90°. In the embodiment, the two first acute angles θ1 between the first top surface TS1 and first side surfaces SD1 on both sides are equal to each other. However, in other embodiments, the two first acute angles θ1 may have different angles. Likewise, the two third acute angles θ3 between the first bottom surface BS1 and the first side surfaces SD1 on both sides are equal to each other. However, in other embodiments, the two third acute angles θ3 may have different angles.

In the present embodiment, TW1 and BW1 are the maximum widths of the first protruding structure PT1, and there is a minimum width of the first protruding structure PT1 between the first top surface TS1 and the first bottom surface BS1 of the first protruding structure PT1. More specifically, in the present embodiment, a height H1 of the first protruding structure PT1 is in a range from 0.01 μm to 10 μm. The width of the first protruding structure at 1/4H1 to 3/4H1 is smaller than the width TW1 of the first top surface TS1 and the width BW1 of the first bottom surface BS1; however, the invention is not limited thereto. In another embodiment, there is a minimum width of the first protruding structure PT1 between the first top surface TS1 and the first bottom surface BS1 of the first protruding structure PT1. TW1 is the maximum width of the first protruding structure PT1 and TW1>BW1. In another embodiment, there is a minimum width between the first top surface TS1 and the first bottom surface BS1 of the first protruding structure PT1. BW1 is the maximum width of the first protruding structure PT1 and BW1>TW1. In other words, it is optional to set the width of the first top surface TS1 or the first bottom surface BS1 of the first protruding structure PT1 to be the maximum width of the first protruding structure PT1. In addition, the first electrode EL1 is disposed on the first top surface TS1 of the first protruding structure PT1 and electrically connected to the active device TFT. The first electrode EL1 extends in the Z direction. In particular, the maximum width of the first electrode EL1 is W, and the width TW1 of the first top surface TS1 is smaller than maximum width W of the first electrode EL1. Likewise, the width BW1 of the first bottom surface BS1 is smaller than the maximum width W of the first electrode EL1.

Further referring to FIG. 3A and FIG. 3B, in the embodiment, a second protruding structure PT2 and the first protruding structure PT1 are separated from each other. The second protruding structure PT2 and the first protruding structure PT1 have the same structure; however, the invention is not limited thereto. Specifically, the second protruding structure PT2 has a second top surface TS2, a second bottom surface BS2 and second side surfaces SD2 located on both sides of the second top surface TS2 and the second bottom surface BS2. The second protruding structure PT2 extends in the Z direction, and the second side surface SD2 is a side surface which extends in the Z direction. The second top surface TS2 has a width TW2. A second acute angle θ2 is formed between the second top surface TS2 and any one of second side surfaces SD2, wherein the second acute satisfies 15°≤θ2<90°. The second bottom surface BS2 has a width BW2. A fourth angle θ4 is formed between the second bottom surface BS2 and any one of second side surfaces SD2, wherein the fourth acute angle satisfies 15°≤θ4<90°. In the embodiment, the two second acute angles θ2 between the second top surface TS2 and the second side surfaces SD2 on both sides have equivalent angles. However, in other embodiments, the two second acute angles θ2 may have different angles. Likewise, the two fourth acute angles θ4 between the second bottom surface BS2 and the second side surfaces SD2 on both sides have equivalent angles. However, in other embodiments, the two fourth acute angles θ4 may have different angles.

In the present embodiment, the second top surface TS2 and the second bottom surface BS2 of the second protruding structure PT2 have a maximum width of the second protruding structure PT2. Further, there is a minimum width of the second protruding structure PT2 in between the second top surface TS2 and the second bottom surface BS2 of the second protruding structure PT2. Specifically, in the embodiment, a height H2 of the second protruding structure PT2 is in a range from 0.01 μm to 10 μm. A width of the second protruding structure at 1/4H2 to 3/4H2 is smaller than the width TW2 of the second top surface TS2 and the width BW2 of the second bottom surface BS2; however, the invention is not limited thereto. In another embodiment, there is a minimum width of the second protruding structure PT2 between the second top surface TS2 and the second bottom surface BS2 of the second protruding structure PT2. TW2 is the maximum width of the second protruding structure PT2 and TW2>BW2. In another embodiment, there is a minimum width of the second protruding structure PT2 between the second top surface TS2 and the second bottom surface BS2 of the second protruding structure PT2. BW2 is the maximum width of the second protruding structure PT2 and BW2>TW2. In other words, it is optional to set the width of the second top surface TS2 or the second bottom surface BS2 of the second protruding structure PT2 to be the maximum width of the second protruding structure PT2.

Moreover, further referring to FIG. 3A. The second electrode EL2 is disposed on the second top surface TS2 of the second protruding structure PT2. The second electrode EL2 extends in the Z direction. In particular, the maximum width of the second electrode EL2 is W', and the width TW2 of the second top surface TS2 is smaller than the maximum width W' of the second electrode EL2. Likewise, the width BW2 of the second bottom surface BS2 is smaller than the maximum width W' of the second electrode EL2. In the present embodiment, the pixel structure has the first protruding structure PT1 and the second protruding structure PT2. The first electrode EL1 and the second electrode EL2 are respectively disposed on the first top surface TS1 and the second top surface TS2 of the first protruding structure PT1 and the second protruding structure PT2. Since the first protruding structure PT1 and the second protruding structure PT2 respectively have the first acute angle θ1 and the second acute angel θ2, therefore, there is a minimum width between the top and bottom surfaces of the first protruding structure PT1 as well as the top and bottom surfaces of the second protruding structure PT2 respectively. In addition, the widths of all the first protruding structure PT1 and the second protruding structure PT2 are smaller than the maximum widths of the first electrode EL1 and the second electrode EL2. Specifically, the widths of the top and bottoms surfaces of the first protruding structure PT1 and the second protruding structure PT2 are smaller than the maximum widths of the first electrode EL1 and the second electrode EL2. Based on the above, the pixel structure of the invention can reduce the operation voltage of the display panel and reduce light leakage in the dark state to improve contrast ratio.

Figure 4:
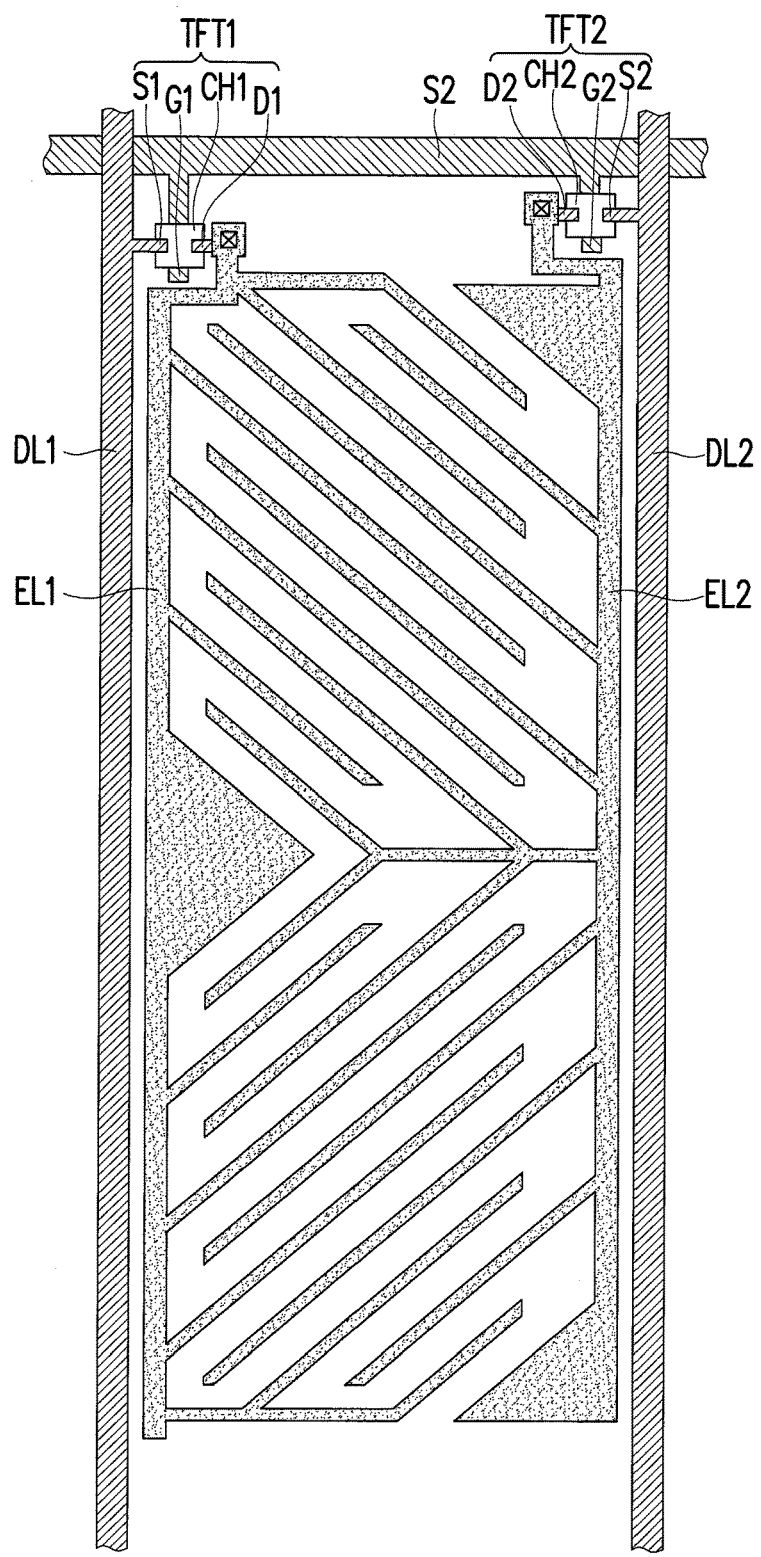
FIG. 4 is a top view illustrating a pixel structure according to another embodiment of the invention.

FIG. 4 is a top view illustrating a pixel structure according to another embodiment of the invention. The pixel structure shown by FIG. 4 is similar to the plurality of pixel structures of the pixel array shown by FIG. 2. The difference lies in that the first electrode EL1 and the second electrode EL2 are designed and connected in different manners. Therefore, the same components are represented by the same reference numbers, and its description thereof is not repeated herein. It should be noted that the pixel array of the invention may be constituted by a plurality of the pixel structure shown by FIG. 4. Specifically, in the embodiment of FIG. 4, a pixel structure includes the scan line SL, the first data line DL1, the second data line DL2, the first active device TFT1, the second active device TFT2, at least one first protruding structure (not shown), at least one second protruding structure PT2 (not shown), the first electrode EL1 and the second electrode EL2. In particular, the first active device TFT1 and the first electrode EL1 are electrically connected together, and the first electrode EL1 has a first potential. The second active device TFT2 and the second electrode EL2 are electrically connected together, and the second electrode EL2 has a second potential. A potential difference between the first electrode EL1 and the second electrode EL2 causes a lateral electric field to be generated between the two electrodes so as to drive a display medium.

Figure 5:
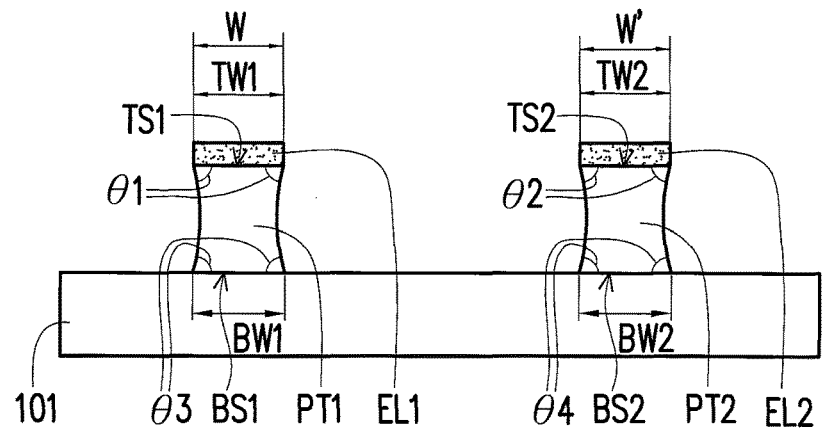
FIG. 5 is a front view illustrating a pixel structure according to a second embodiment of the invention.

FIG. 5 is a front view illustrating a pixel structure according to a second embodiment of the invention. The pixel structure shown by FIG. 5 is similar to the pixel structure shown by FIG. 3B. Therefore, the same components are represented by the same reference numbers, and its description thereof is not repeated herein. The difference between the embodiment shown by FIG. 5 and the embodiment shown by FIG. 3B lies in that the maximum width W of the first electrode EL1 in FIG. 5 is equal to the width TW1 of the first top surface TS1 of the first protruding structure PT1 and equal to the width BW1 of the first bottom surface BS1. In addition, the maximum W' of the second electrode EL2 is equal to the width TW2 of the second top surface TS2 of the second protruding structure PT2, and equal to the width BW2 of the second bottom surface BS2. In the present embodiment, the first protruding structure PT1 and the second protruding structure PT2 respectively have the first acute angle θ1 and the second acute angle θ2, the top and bottom surfaces of the first protruding structure PT1 and the second protruding structure PT2 have a maximum width, and there is a minimum width between the top and bottom surfaces. In the meantime, the widths of the top and bottom surfaces of the first protruding structure PT1 and the second protruding structure PT2 are equal to the maximum widths of the first electrode EL1 and the second electrode EL2. Based on the above, the pixel structure of the invention can reduce the operation voltage of the display panel and reduce light leakage in the dark state to improve contrast ratio.

Figure 6:
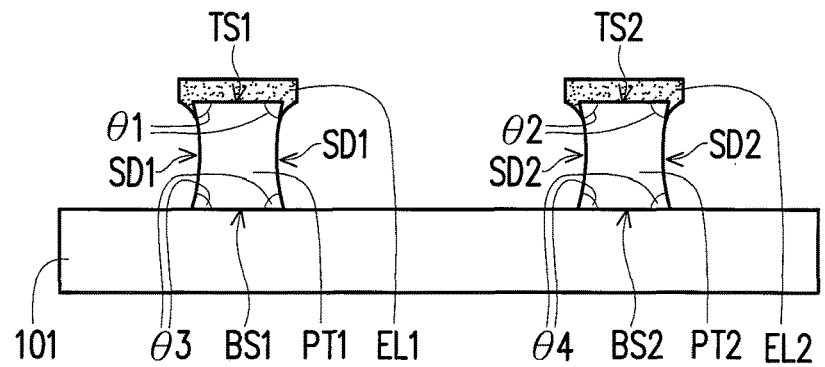
FIG. 6 is a front view illustrating a pixel structure according to a third embodiment of the invention.

FIG. 6 is a front view illustrating a pixel structure according to a third embodiment of the invention. The pixel structure shown by FIG. 6 is similar to the pixel structure shown by FIG. 3B. Therefore, the same components are represented by the same reference numbers, and its description thereof is not repeated herein. The difference between the embodiment shown by FIG. 6 and the embodiment shown by FIG. 3B lies in that, in FIG. 6, the first electrode EL1 is disposed on the first top surface TS1 of the first protruding structure PT 1 and covers a portion of the first side surface SD1, and the second electrode EL2 is disposed on the second top surface TS2 of the second protruding structure PT2 and covers a portion of the second side surface SD2. In the present embodiment, the first protruding structure PT1 and the second protruding structure PT2 respectively have the first acute angle θ1 and the second acute angle θ2, the top and bottom surfaces of the first protruding structure PT1 and the second protruding structure PT2 respectively have a maximum width, and there is a minimum width between the top and bottom surfaces. Moreover, the widths of the top and bottom surfaces of the first protruding structure PT1 and the second protruding structure PT2 are smaller than the maximum widths of the first electrode EL1 and the second electrode EL2. Based on the above, the pixel structure of the invention can reduce the operation voltage of the display panel and reduce light leakage in the dark state to improve contrast ratio.

Figure 7:
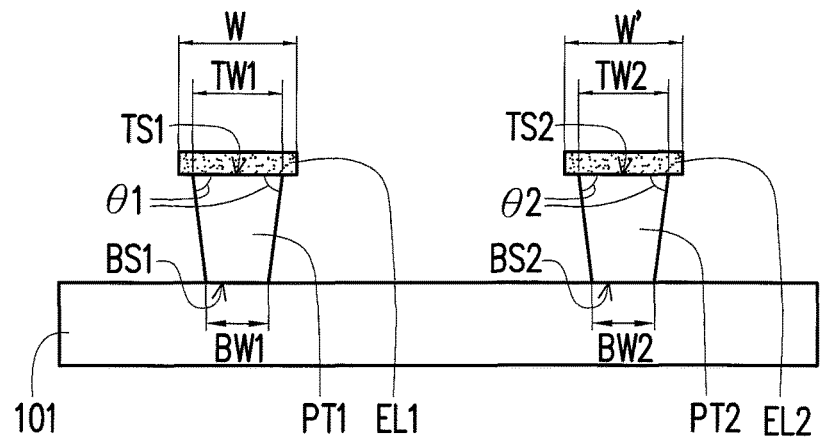
FIG. 7 is a front view illustrating a pixel structure according to a fourth embodiment of the invention.

FIG. 7 is a front view illustrating a pixel structure according to a fourth embodiment of the invention. The pixel structure shown by FIG. 7 is similar to the pixel structure shown by FIG. 3B. Therefore, the same components are represented by the same reference numbers, and its description thereof is not repeated herein. The difference between the embodiment shown by FIG. 7 and the embodiment shown by FIG. 3B lies in that, in FIG. 7, TW1 is the maximum width of the first protruding structure PT1 and BW1 is the minimum width of the first protruding structure PT1. In addition, TW2 is the maximum width of the first protruding structure PT2 and BW2 is the minimum width of the first protruding structure PT2. In the embodiment, since the first protruding structure PT1 and the second protruding structure PT2 respectively have the first acute angle θ1 and second acute angle θ2, and the widths of the top and bottom surfaces of the first protruding structure PT1 and the second protruding structure PT2 are smaller than the maximum widths of the first electrode EL1 and the second electrode EL2, the pixel structure of the invention can reduce the operation voltage of the display panel and reduce light leakage in the dark state to improve contrast ratio.

Figure 8:
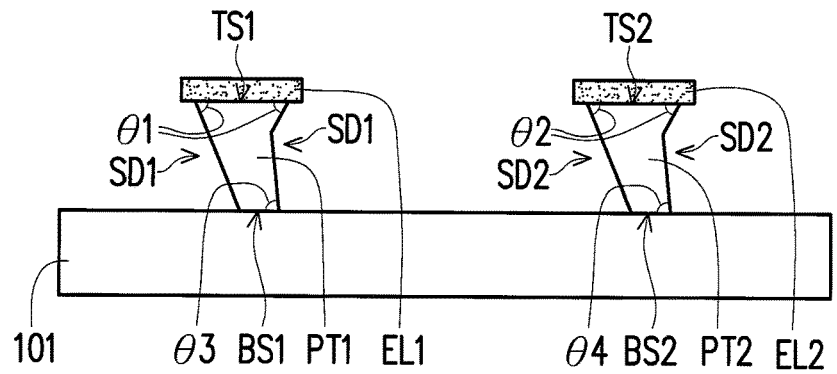
FIG. 8 is a front view illustrating a pixel structure according to a fifth embodiment of the invention.

FIG. 8 is a front view illustrating a pixel structure according to a fifth embodiment of the invention. The pixel structure shown by FIG. 8 is similar to the pixel structure shown by FIG. 7. Therefore, the same components are represented by the same reference numbers, and its description thereof is not repeated herein. The difference between the embodiment shown by FIG. 8 and the embodiment shown by FIG. 7 lies in that the shape design of the first protruding structure PT1 is different from that of the second protruding structure PT2. Specifically, in the embodiment, the left and right sides of the first side surfaces SD1 of the first protruding structure PT1 are asymmetrical, and the left and right sides of the second side surfaces SD2 of the second protruding structure PT2 are asymmetrical. Moreover, the third acute angle θ3 is only formed between the first bottom surface BS1 of the first protruding structure PT1 and one of the first side surfaces SD1. Meanwhile, the fourth acute angle θ4 is only formed between the second bottom surface BS2 of the second protruding structure PT2 and one of the second side surfaces SD2. Likewise, in the embodiment illustrated by FIG. 8, since the first protruding structure PT1 and the second protruding structure PT2 respectively have the first acute angle θ1 and the second acute angle θ2, and the width of the top and bottom surfaces of the first protruding structure PT1 and the second protruding structure PT2 are smaller than the maximum width of the first electrode EL1 and the second electrode EL2, the pixel structure of the invention can reduce the operation voltage of the display panel and reduce light leakage in the dark state to improve contrast ratio.

Figure 9:
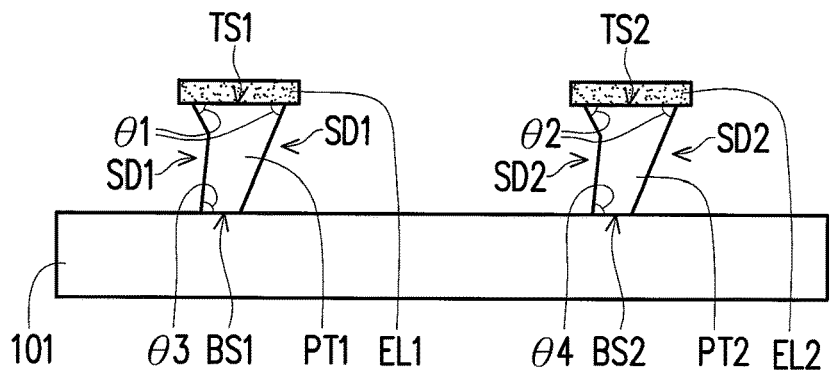
FIG. 9 is a front view illustrating a pixel structure according to a sixth embodiment of the invention.

FIG. 9 is a front view illustrating a pixel structure according to a sixth embodiment of the invention. The pixel structure shown by FIG. 9 is similar to the pixel structure shown by FIG. 8. Therefore, the same components are represented by the same reference numbers, and its description thereof is not repeated herein. Specifically, the difference between the embodiment shown by FIG. 9 and the embodiment shown by FIG. 8 lies in that the embodiment illustrated by FIG. 9 is a mirrored configuration of the embodiment illustrated by FIG. 8. Likewise, in the embodiment illustrated by FIG. 9, since the first protruding structure PT1 and the second protruding structure PT2 respectively have the first acute angle θ1 and the second acute angle θ2, and the width of the top and bottom surfaces of the first protruding structure PT1 and the second protruding structure PT2 are smaller than the maximum width of the first electrode EL1 and the second electrode EL2, the pixel structure of the invention can reduce the operation voltage of the display panel and reduce light leakage in the dark state to improve contrast ratio.

Figure 10:
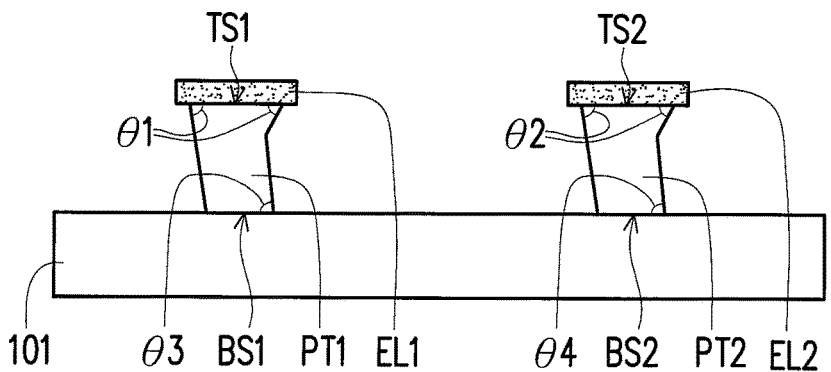
FIG. 10 is a front view illustrating a pixel structure according to a seventh embodiment of the invention.

FIG. 10 is a front view illustrating a pixel structure according to a seventh embodiment of the invention. The pixel structure shown by FIG. 10 is similar to the pixel structure shown by FIG. 8. Therefore, the same components are represented by the same reference numbers, and its description thereof is not repeated herein. Specifically, in the embodiment illustrated by FIG. 10, the first protruding structure PT1 has a minimum width in a consecutive range which extends from between the top surface TS1 and the bottom surface BS1 to the bottom surface BS1. Also, the second protruding structure PT2 has a minimum width in a consecutive range which extends from between the top surface TS2 and the bottom surface BS2 to the bottom surface BS2. Likewise, in the embodiment illustrated by FIG. 10, since the first protruding structure PT1 and the second protruding structure PT2 respectively have the first acute angle θ1 and the second acute angle θ2, and the width of the top and bottom surfaces of the first protruding structure PT1 and the second protruding structure PT2 are smaller than the maximum width of the first electrode EL1 and the second electrode EL2, the pixel structure of the invention can reduce the operation voltage of the display panel and reduce light leakage in the dark state to improve contrast ratio.

Figure 11:
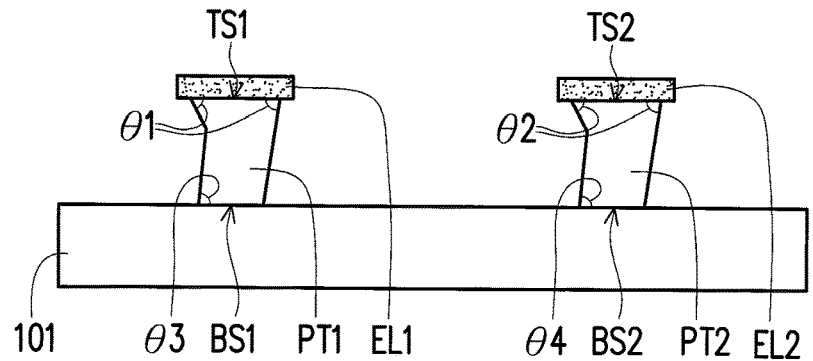
FIG. 11 is a front view illustrating a pixel structure according to an eighth embodiment of the invention.

FIG. 11 is a front view illustrating a pixel structure according to an eighth embodiment of the invention. The pixel structure shown by FIG. 11 is similar to the pixel structure shown by FIG. 10. Therefore, the same components are represented by the same reference numbers, and its description thereof is not repeated herein. Specifically, the difference between the embodiments illustrated by FIG. 11 and FIG. 10 lies in that the embodiment illustrated by FIG. 11 is a mirrored configuration of the embodiment illustrated by FIG. 10. Likewise, in the embodiment illustrated by FIG. 11, since the first protruding structure PT1 and the second protruding structure PT2 respectively have the first acute angle θ1 and the second acute angle θ2, and the width of the top and bottom surfaces of the first protruding structure PT1 and the second protruding structure PT2 are smaller than the maximum width of the first electrode EL1 and the second electrode EL2, the pixel structure of the invention can reduce the operation voltage of the display panel and reduce light leakage in the dark state to improve contrast ratio.

Figure 12:
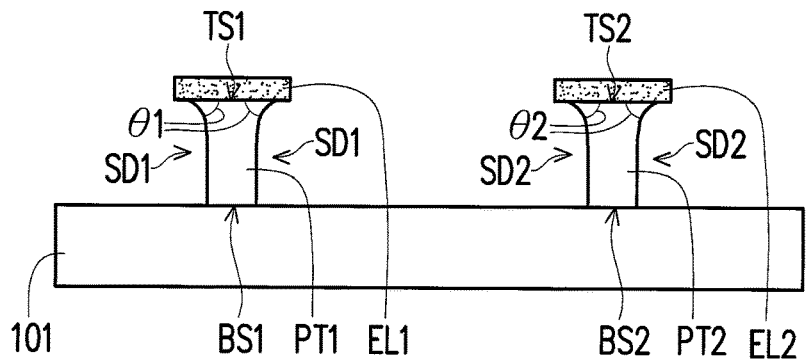
FIG. 12 is a front view illustrating a pixel structure according to a ninth embodiment of the invention.

FIG. 12 is a front view illustrating a pixel structure according to a ninth embodiment of the invention. The pixel structure shown by FIG. 12 is similar to the pixel structure shown by FIG. 3B. Therefore, the labeling of some components is omitted and its description thereof is not repeated herein. The difference between the embodiments illustrated by FIG. 12 and FIG. 3B lies in that, in the pixel structure shown by FIG. 12, an included angle between the first bottom surface BS1 and any one of first side surface SD1 and an included angle between the second bottom surface BS2 and any one of second side surface SD2 are equal to 90° instead of being an acute angle. However, in the embodiment, since the first protruding structure PT1 and the second protruding structure PT2 respectively have the first acute angle θ1 and the second acute angle θ2, and the width of the top and bottom surfaces of the first protruding structure PT1 and the second protruding structure PT2 are smaller than the maximum width of the first electrode EL1 and the second electrode EL2, the pixel structure of the invention can reduce the operation voltage of the display panel and reduce light leakage in the dark state to improve contrast ratio.

Figure 13:
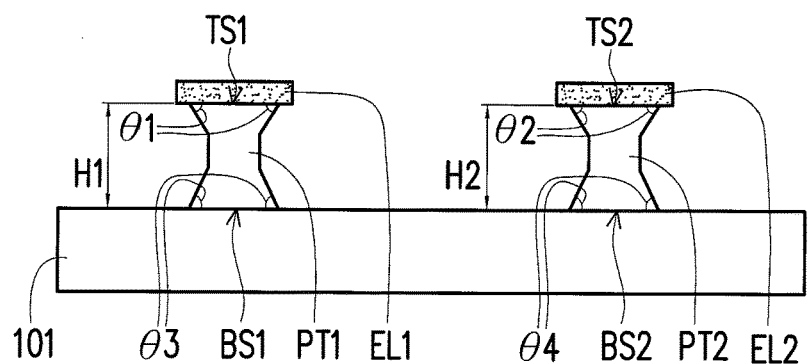
FIG. 13 is a front view illustrating a pixel structure according to a tenth embodiment of the invention.

FIG. 13 is a front view illustrating a pixel structure according to a tenth embodiment of the invention. The pixel structure shown by FIG. 13 is similar to the pixel structure shown by FIG. 3B. Therefore, the labeling of some components is omitted and its description thereof is not repeated herein. The difference between the embodiments illustrated by FIG. 13 and FIG. 3B lies in that the shape design of the first protruding structure PT1 and the second protruding structure PT2 are different. Specifically, in the pixel structure illustrated by FIG. 3B, there is a minimum width between the height 1/4H1 to 3/4H1 of the first protruding structure, and there is a minimum width between the height 1/4H2 to 3/4H2 of the second protruding structure. Relatively, in the pixel structure illustrated by FIG. 13, there is a minimum width in a consecutive range between the height 1/4H1 to 3/4H1 of the first protruding structure PT1, and there is a minimum width in a consecutive range between the height 1/4H2 to 3/4H2 of the second protruding structure PT2. Likewise, in the embodiment illustrated by FIG. 13, since the first protruding structure PT1 and the second protruding structure PT2 respectively have the first acute angle θ1 and the second acute angle θ2, and the width of the top and bottom surfaces of the first protruding structure PT1 and the second protruding structure PT2 are smaller than the maximum width of the first electrode EL1 and the second electrode EL2, the pixel structure of the invention can reduce the operation voltage of the display panel and reduce light leakage in the dark state to improve contrast ratio.

Figure 14:
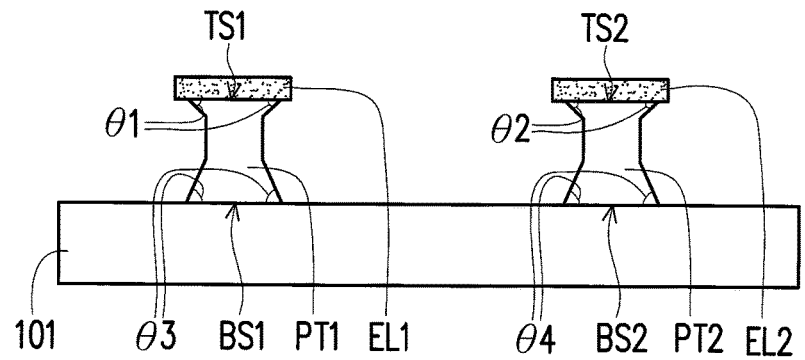
FIG. 14 is a front view illustrating a pixel structure according to an eleventh embodiment of the invention.

FIG. 14 is a front view illustrating a pixel structure according to an eleventh embodiment of the invention. The pixel structure shown by FIG. 14 is similar to the pixel structure shown by FIG. 13. Therefore, the same components are represented by the same reference numbers, and its description thereof is not repeated herein. The difference between the embodiments illustrated by FIG. 14 and FIG. 13 lies in that the shape design of the first protruding structure PT1 and the second protruding structure PT2 are different. Specifically, in the pixel structure illustrated by FIG. 14, only the position of the minimum width in a consecutive range of the first protruding structure PT1 and the second protruding structure PT2 shown by FIG. 13 is shifted. Likewise, in the embodiment illustrated by FIG. 14, since the first protruding structure PT1 and the second protruding structure PT2 respectively have the first acute angle θ1 and the second acute angle θ2, and the width of the top and bottom surfaces of the first protruding structure PT1 and the second protruding structure PT2 are smaller than the maximum width of the first electrode EL1 and the second electrode EL2, the pixel structure of the invention can reduce the operation voltage of the display panel and reduce light leakage in the dark state to improve contrast ratio.

Figure 15:
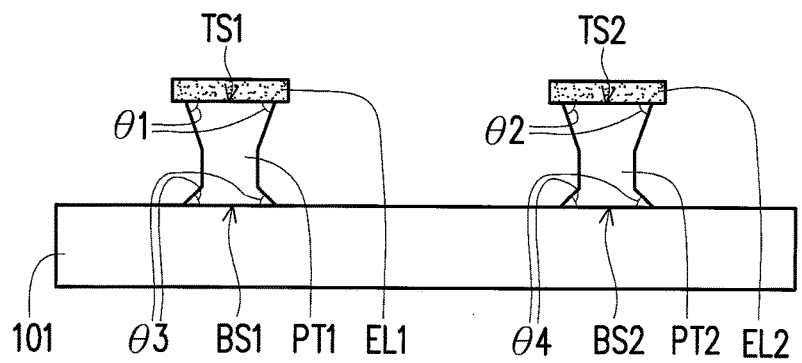
FIG. 15 is a front view illustrating a pixel structure according to a twelfth embodiment of the invention.

FIG. 15 is a front view illustrating a pixel structure according to a twelfth embodiment of the invention. The pixel structure shown by FIG. 15 is similar to the pixel structure shown by FIG. 13. Therefore, the same components are represented by the same reference numbers, and its description thereof is not repeated herein. The difference between the embodiments illustrated by FIG. 15 and FIG. 13 lies in that the shape design of the first protruding structure PT1 and the second protruding structure PT2 are different. Specifically, in the pixel structure illustrated by FIG. 15, only the position of the minimum width in a consecutive range of the first protruding structure PT1 and the second protruding structure PT2 shown by FIG. 13 is shifted. Likewise, in the embodiment illustrated by FIG. 15, since the first protruding structure PT1 and the second protruding structure PT2 respectively have the first acute angle θ1 and the second acute angle θ2, and the width of the top and bottom surfaces of the first protruding structure PT1 and the second protruding structure PT2 are smaller than the maximum width of the first electrode EL1 and the second electrode EL2, the pixel structure of the invention can reduce the operation voltage of the display panel and reduce light leakage in the dark state to improve contrast ratio.

Figure 16:
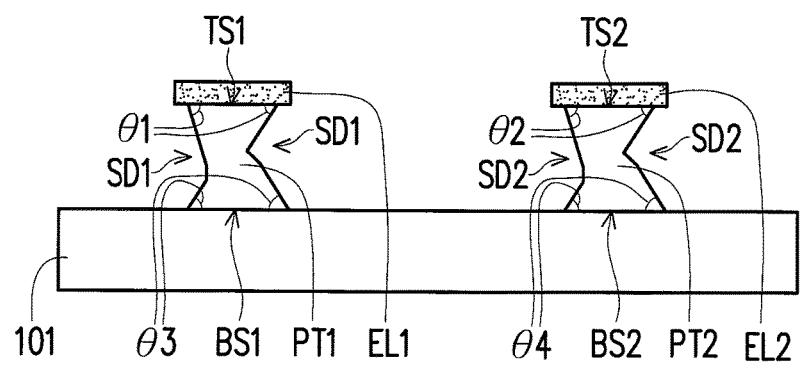
FIG. 16 is a front view illustrating a pixel structure according to a thirteenth embodiment of the invention.

FIG. 16 is a front view illustrating a pixel structure according to a thirteenth embodiment of the invention. The pixel structure shown by FIG. 16 is similar to the pixel structure shown by FIG. 3B. Therefore, the labeling of some components is omitted and its description thereof is not repeated herein. The difference between the embodiments illustrated by FIG. 16 and FIG. 3B lies in that the shape design of the first protruding structure PT1 and the second protruding structure PT2 are different. Specifically, in the pixel structure in the embodiment illustrated by FIG. 3B, the first protruding structure PT1 is designed to make the left and right sides of the first sides surfaces SD1 to be symmetrical, and the second protruding structure PT2 is designed to make the left and right sides of the second sides surfaces SD2 to be symmetrical. Relatively, in the embodiment shown by FIG. 16, the left and right sides of the first side surfaces SD1 of the first protruding structure PT1 are asymmetrical, and the left and right sides of the second side surfaces SD2 of the second protruding structure PT2 are asymmetrical. Likewise, in the embodiment illustrated by FIG. 16, since the first protruding structure PT1 and the second protruding structure PT2 respectively have the first acute angle θ1 and the second acute angle θ2, and the width of the top and bottom surfaces of the first protruding structure PT1 and the second protruding structure PT2 are smaller than the maximum width of the first electrode EL1 and the second electrode EL2, the pixel structure of the invention can reduce the operation voltage of the display panel and reduce light leakage in the dark state to improve contrast ratio.

Figure 17:
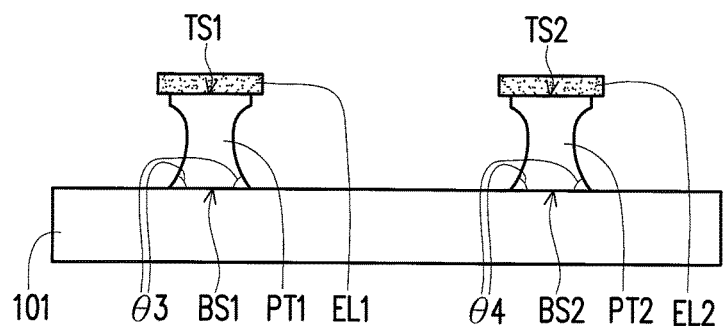
FIG. 17 is a front view illustrating a pixel structure according to a fourteenth embodiment of the invention.

FIG. 17 is a front view illustrating a pixel structure according to a fourteenth embodiment of the invention. The pixel structure shown by FIG. 17 is similar to the pixel structure shown by FIG. 3B. Therefore, the labeling of some components is omitted and its description thereof is not repeated herein. The difference between the embodiments illustrated by FIG. 17 and FIG. 3B lies in that the pixel structure shown by FIG. 17 does not have the first acute angle θ1 and the second acute angle θ2. Relatively, the included angle mentioned here is equal to 90° instead of less than 90°. However, in the embodiment, there is a minimum width of the first protruding structure PT1 between the first top surface TS1 and the first bottom surface BS1 of the first protruding structure PT1, and there is a minimum width of the second protruding structure PT2 of the second top surface TS2 and second bottom surface BS2 of the second protruding structure PT2. Meanwhile, the width of the top and bottom surfaces of the first protruding structure PT1 and the second protruding structure PT2 are smaller than the maximum width of the first electrode EL1 and the second electrode EL2; based on the above, the pixel structure of the invention can reduce the operation voltage of the display panel and reduce light leakage in the dark state to improve contrast ratio.

Figure 18A:
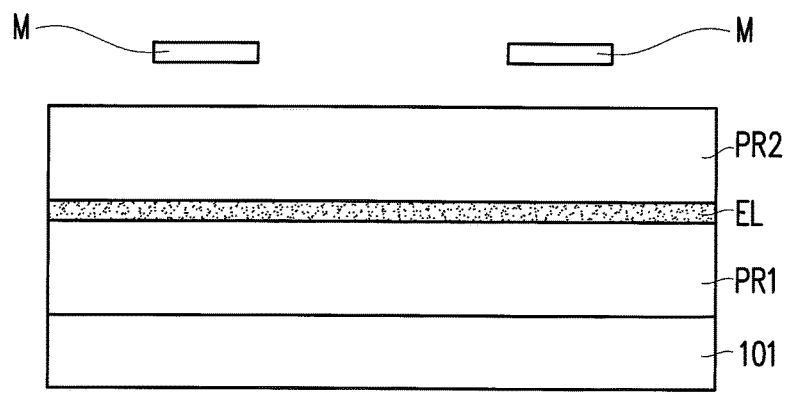
FIGS. 18A to 18E are flow charts illustrating the manufacturing of a pixel structure according to an embodiment of the invention.
Figure 18B:
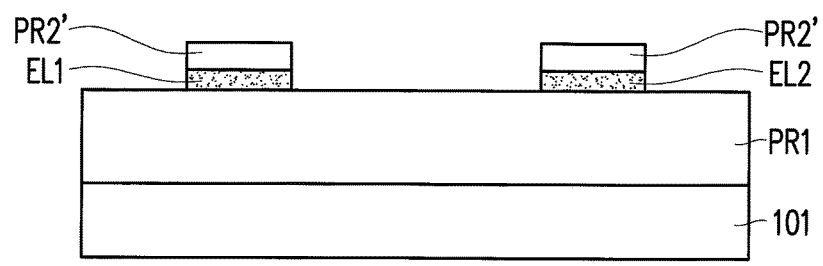
Figure 18C:
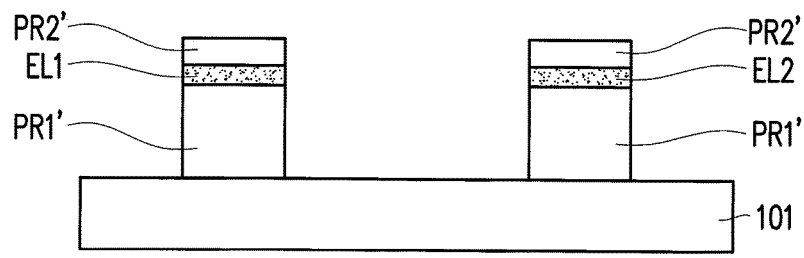
Figure 18D:
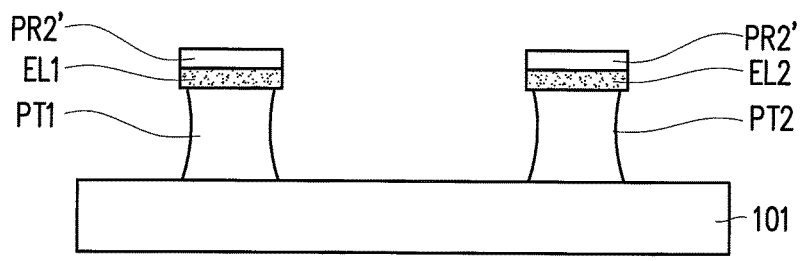
Figure 18E:
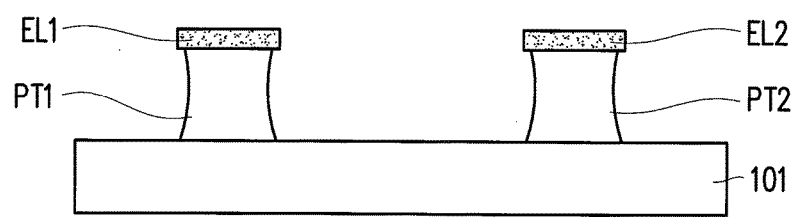

FIGS. 18A to 18E are flow charts illustrating the manufacturing of a pixel structure according to an embodiment of the invention. Firstly, please refer to FIG. 18A, a first material layer PR1, an electrode layer EL and a second material layer PR2 are sequentially formed on a first substrate 101. The first material layer PR1 and the second material layer PR2 are, for example, a photoresist material layer; however, the invention is not limited thereto. Thereafter, by performing pattern exposure to a mask M followed by performing a developing step, thereby selectively removing an exposing portion a patterned second material layer PR2', the first electrode EL1 and the second electrode. EL2 are formed as shown by FIG. 18B. Next, in the step shown by FIG. 18C, an etching step is performed so as to form a patterned first material layer PR1'. Further, in the step shown by FIG. 18D, an etching step is performed so as to form the first protruding structure PT1 and the second protruding structure PT2. Taking a dry etching process as an example, the dry etching can be performed in the condition of using sulfur fluoride ($SF_6$) gas at 133 sccm (standard cubic centimeter per minute), oxygen ($O_2$) at 200 sccm, pressure at 50 mTorr with power of 1000 W, and the dry etching step is performed continuously for 235 seconds. In the step illustrated by FIG. 18E, the patterned second material layer PR2' is removed so as to form the pixel structure as illustrated by FIG. 3B.

EXPERIMENTAL EXAMPLE

To prove that the pixel structure of the invention can reduce operation voltage of the display panel and reduce light leakage in the dark state to improve display contrast ratio, comparative examples and an experimental example are provided below for description.

Comparative Example 1

Figure 19:
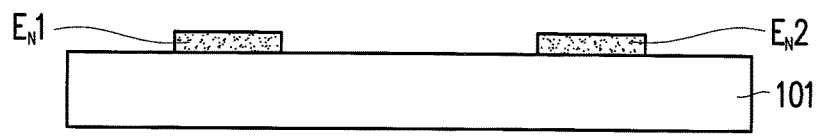
FIG. 19 is a front view illustrating a pixel structure according to a first comparative example of the invention.

FIG. 19 is a front view illustrating a pixel structure according to a first comparative example of the invention. The pixel structure shown by FIG. 19 is similar to the pixel structure shown by FIG. 3B. Therefore, the labeling of some components is omitted and its description thereof is not repeated herein. The difference between the embodiments illustrated by FIG. 19 and FIG. 3B lies in that, in the comparative example illustrated by FIG. 19, the pixel structure does not have any protruding structure. There are only a first electrode $E_N1$ and a second electrode $E_N2$ disposed on the first substrate 101.

Comparative Example 2

Figure 20:
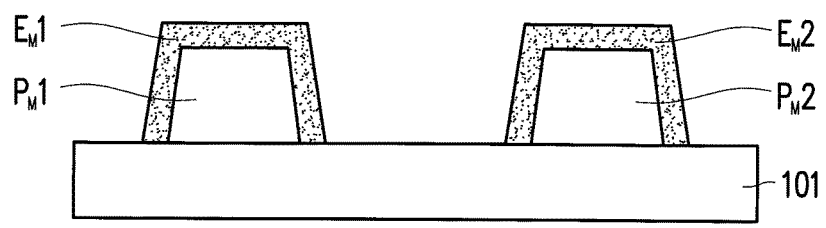
FIG. 20 is a front view illustrating a pixel structure according to a second comparative example of the invention.

FIG. 20 is a front view illustrating a pixel structure according to a second comparative example of the invention. The pixel structure shown in the comparative example of FIG. 20 is similar to the pixel structure shown by FIG. 3B. Therefore, the labeling of some components is omitted and its description thereof is not repeated herein. The difference between the embodiments illustrated by FIG. 20 and FIG. 3B lies in that, in the comparative example shown by FIG. 20, there is no acute angle between the top surface and side surfaces of a first protruding structure $P_M1$ and a second protruding structure $P_M2$. Meanwhile, the side surface is completely covered by a first electrode $E_M1$ and a second electrode $E_M2$.

Comparative Example 3

Figure 21:
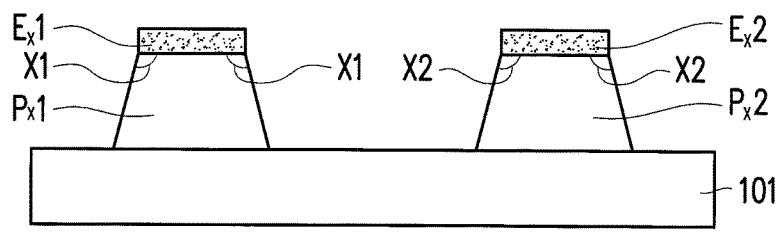
FIG. 21 is a front view illustrating a pixel structure according to a third comparative example of the invention.

FIG. 21 is a front view illustrating a pixel structure according to a third comparative example of the invention. The pixel structure shown by the comparative example of FIG. 21 is similar to the pixel structure shown by FIG. 3B. Therefore, the labeling of some components is omitted and its description thereof is not repeated herein. The difference between the embodiments illustrated by FIG. 21 and FIG. 3B lies in that, in the pixel structure in the comparative example illustrated by FIG. 21, a first included angle X1 between the top surface and side surfaces of a first protruding structure $P_X1$ is an obtuse angle, and a second included angle X2 between the top surface and side surface of a second protruding structure $P_X2$ is an obtuse angle. In addition, a first electrode $E_X1$ and a second electrode $E_X2$ are only disposed on the top surface of the first protruding structure $P_X1$ and the second protruding structure $P_X2$.

Experimental Example 1

The pixel structure in FIG. 3B is used as the pixel structure in the experimental example 1 of the invention, and is compared to the pixel structures in Comparative example 1 through Comparative example 3 as illustrated by FIG. 19 to FIG. 21 regarding the aspect of operation voltage, contrast ratio and luminance in the dark state (without supply of operation voltage). In Experimental example 1 as well as Comparative example 1 through Comparative example 3, the electrode widths are all the same. The result of experiment is described below in details in Table 1.

TABLE 1

| | Experimental example 1 | Comparative example 1 | Comparative example 2 | Comparative example 3 |
| --- | --- | --- | --- | --- |
| Operation voltage (Vmax) | 40 | 52 | 40 | 54 |
| Contrast ratio (CR) | 1330 | 1479 | 434 | 573 |
| Luminance in the dark state (nits) | 0.359 | 0.327 | 1.099 | 0.830 |

The experiment result described in Table 1 shows that, when the pixel structure does not have the protruding structure (see Comparative example 1), the problem of high operation voltage occurs. On the other hand, when the pixel structure has the protruding structure with its side surface completely covered by the electrode (see Comparative example 2), the problem lies in that there is significant light leakage in the dark state, which causes contrast ratio to be decreased. Moreover, when the pixel structure has the protruding structure, but the included angle between the top surface and side surfaces of the protruding structure is an obtuse angle (see Comparative example 3), the protruding structure under the electrode disturbs the electric field direction, causing the problem of high operation voltage, light leakage in the dark state and low contrast ratio. In comparisons, the pixel structure provided in Experimental example 1 of the invention can effectively reduce operation voltage while reducing light leakage in the dark state and retaining ideal contrast ratio.

In summary, in the invention, the pixel structure has the first protruding structure PT1 and the second protruding structure PT2. The first electrode EL1 and the second electrode EL2 are respectively disposed on the first top surface TS1 and the second top surface TS2 of the first protruding structure PT1 and the second protruding structure PT2. In particular, in the first protruding structure PT1, the first acute angle θ1 is formed between the first top surface TS1 and any one of the first side surfaces SD1. In the second protruding structure PT2, the second acute angle θ2 is formed between the second top surface TS2 and any one of the second side surfaces SD2. Also, in the invention, there is a minimum width of the first protruding structure PT1 and the second protruding structure PT2 in the pixel structure of the invention. The width of all the first protruding structure PT1 and the second protruding structure PT2 is not larger than the maximum width of the first electrode EL1 and the second electrode EL2. Specifically, the width of the first top surface TS1 and the second top surface TS2 is not larger than the maximum width of the first electrode EL1 and the second electrode EL2. Based on the above, in the pixel structure of the invention, the disposition of the protruding structure can reduce the operation voltage of the display panel, and reduce light leakage so as to improve contrast ratio.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A pixel structure, comprising:
   a scan line and a data line;
   an active device, electrically connected to the scan line and the data line;
   at least a first protruding structure, wherein the first protruding structure comprises a first top surface, a first bottom surface and first side surfaces located on both sides of the first top surface and the first bottom surface, an acute angle θ1 is formed between the first top surface and any one of the first side surfaces;
   at least a second protruding structure separated from the first protruding structure, wherein the second protruding structure comprises a second top surface, a second bottom surface and second side surfaces located on both sides of the second top surface and the second bottom surface, an acute angle θ2 is formed between the second top surface and any one of the second side surfaces;
   a first electrode, disposed on the first top surface of the first protruding structure; and
   a second electrode, disposed on the second top surface of the second protruding structure, wherein:
   an acute angle θ3 is formed between the first bottom surface and any one of the first side surfaces; and
   an acute angle θ4 is formed between the second bottom surface and any one of the second side surfaces.

2. The pixel structure according to claim 1, wherein the first electrode has a first potential, and the second electrode has a second potential.

3. The pixel structure according to claim 1, wherein:
   the acute angle θ 1 is 15°≤θ1<90°, and
   the acute angle θ 2 is 15°≤θ2<90°.

4. The pixel structure according to claim 1, wherein:
   a width of the first top surface of the first protruding structure is TW1, a maximum width of the first electrode disposed on the first top surface is W, and TW1≤W; and
   a width of the second top surface of the second protruding structure is TW2, a maximum width of the second electrode disposed on the second top surface is W', and TW2≤W'.

5. The pixel structure according to claim 1, wherein:
   a width of the first bottom surface of the first protruding structure is BW1, a maximum width of the first electrode disposed on the first top surface of the first protruding structure is W, and BW1≤W; and a width of the second bottom surface of the second protruding structure is BW2, a maximum width of the second electrode disposed on the second top surface of the second protruding structure is W', and BW2≤W'.

6. The pixel structure according to claim 1, wherein:
the first top surface of the first protruding structure has a maximum width of the first protruding structure and the first bottom surface has a minimum width of the first protruding structure, or a minimum width of the first protruding structure is between the first top surface and the first bottom surface and the first top surface or the first bottom surface of the first protruding structure has a maximum width of the first protruding structure; and
the second top surface of the second protruding structure has a maximum width of the second protruding structure and the second bottom surface has a minimum width of the second protruding structure, or a minimum width of the second protruding structure is between the second top surface and the second bottom surface and the second top surface or the second bottom surface of the second protruding structure has a maximum width of the second protruding structure.

7. The pixel structure according to claim 1, wherein:
the acute angle θ 3 is 15°≤θ3<90°, and
the acute angle θ 4 is 15°≤θ4<90°.

8. The pixel structure according to claim 1, wherein a height of the first protruding structure is 0.01 μm to 10 μm, and a height of the second protruding structure is 0.01 μm to 10 μm.

9. The pixel structure according to claim 1, wherein:
the first electrode is disposed on the first top surface of the first protruding structure and covers a portion of the first side surface; and
the second electrode is disposed on the second top surface of the second protruding structure and covers a portion of the second side surface.

10. A pixel structure, comprising:
a scan line and a data line;
an active device, electrically connected to the scan line and the data line;
at least a first protruding structure, the first protruding structure comprising a first top surface and a first bottom surface, the first top surface has a width TW1, and the first bottom surface has a width BW1, wherein there is a minimum width of the first protruding structure between the first top surface and the first bottom surface of the first protruding structure and TW1 or BW1 is a maximum width of the first protruding structure;
at least a second protruding structure separated from the first protruding structure, the second protruding structure comprising a second top surface and a second bottom surface, the second top surface has a width TW2, and the second bottom surface has a width BW2, wherein there is a minimum width of the second protruding structure between the second top surface and the second bottom surface of the second protruding structure and TW2 or BW2 is a maximum width of the second protruding structure;
a first electrode disposed on the first top surface of the first protruding structure, and a maximum width of the first electrode is W, wherein W≥TW1 and W≥BW1, wherein the first electrode has a first potential; and
a second electrode disposed on the second top surface of the second protruding structure, and a maximum width of the second electrode is W', wherein W'≥TW2 and W'≥BW2, wherein the second electrode has a second potential.

11. The pixel structure according to claim 10, wherein:
the first electrode is disposed on the first top surface of the first protruding structure and covers a portion of the first side surface, and
the second electrode is disposed on the second top surface of the second protruding structure and covers a portion of the second side surface.

12. The pixel structure according to claim 10, wherein:
an acute angle θ3 is formed between the first bottom surface and any one of the first side surfaces; and
an acute angle θ4 is formed between the second bottom surface and any one of the second side surfaces.

13. A display panel, comprising:
a first substrate;
a pixel array, disposed on the first substrate and comprises a plurality of pixel structures, wherein each pixel structure comprises:
a scan line and a data line;
an active device, electrically connected to the scan line and the data line;
at least a first protruding structure, wherein the first protruding structure comprises a first top surface, a first bottom surface and first side surfaces located on both sides of the first top surface and the first bottom surface, an acute angle θ1 is formed between the first top surface and any one of the first side surfaces;
at least a second protruding structure separated from the first protruding structure, wherein the second protruding structure comprises a second top surface, a second bottom surface and second side surfaces located on both sides of the second top surface and the second bottom surface, an acute angle θ2 is formed between the second top surface and any one of the second side surfaces;
a first electrode, disposed on the first top surface of the first protruding structure; and
a second electrode disposed on the second top surface of the second protruding structure, wherein:
an acute angle θ3 is formed between the first bottom surface and any one of the first side surfaces; and
an acute angle θ4 is formed between the second bottom surface and any one of the second side surfaces;
a second substrate, disposed on an opposite side of the first substrate; and
a display medium, disposed between the first substrate and the second substrate, wherein the display medium has optical isotropy and optical anisotropy based on driving of voltage.

14. The display panel according to claim 13, wherein the first electrode has a first potential, and the second electrode has a second potential.

15. The display panel according to claim 13, wherein:
a width of the first top surface of the first protruding structure is TW1, a maximum width of the first electrode disposed on the first top surface is W, and TW1≤W, and
a width of the second top surface of the second protruding structure is TW2, a maximum width of the second electrode disposed on the second top surface is W', and TW2≤W'.

16. The display panel according to claim 13, wherein:
- a width of the first bottom surface of the first protruding structure is BW1, a maximum width of the first electrode disposed on the first top surface is W and BW1≤W, and
- a width of the second bottom surface of the second protruding structure is BW2, a maximum width of the second electrode disposed on the second top surface is W' and BW2≤W'.

17. The display panel according to claim 13, wherein:
- the first top surface of the first protruding structure has a maximum width of the first protruding structure and the first bottom surface has a minimum width of the first protruding structure, or a minimum width of the first protruding structure is between the first top surface and the first bottom surface, and the first top surface or the first bottom surface of the first protruding structure has a maximum width of the first protruding structure, and
- the second top surface of the second protruding structure has a maximum width of the second protruding structure and the second bottom surface has a minimum width of the second protruding structure, or a minimum width of the second protruding structure is between the second top surface and the second bottom surface, and the second top surface or the second bottom surface of the second protruding structure has a maximum width of the second protruding structure.

* * * * *